(12) United States Patent
Ishikawa et al.

(10) Patent No.: US 7,916,029 B2
(45) Date of Patent: Mar. 29, 2011

(54) RFID TAG AND METHOD FOR MANUFACTURING THE SAME

(75) Inventors: Naoki Ishikawa, Kawasaki (JP); Hiroshi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 12/193,097

(22) Filed: Aug. 18, 2008

(65) Prior Publication Data

US 2009/0128297 A1 May 21, 2009

(30) Foreign Application Priority Data

Nov. 21, 2007 (JP) ................................. 2007-301868

(51) Int. Cl.
*G08B 13/00* (2006.01)
(52) U.S. Cl. ..................... 340/572.1; 340/10.1; 340/10.5
(58) Field of Classification Search .................. 340/505, 340/572, 10
See application file for complete search history.

(56) References Cited

U.S. PATENT DOCUMENTS 7,619,531 B2 * 11/2009 Carrender et al. ......... 340/572.7
2007/0017986 A1 * 1/2007 Carrender et al. ............ 235/435
2008/0129455 A1 * 6/2008 Oberle .......................... 340/10.1
2009/0108993 A1 * 4/2009 Forster .......................... 340/10.1
2010/0079290 A1 * 4/2010 Phaneuf ...................... 340/572.8
2010/0176971 A1 * 7/2010 Banerjee et al. .............. 340/928

FOREIGN PATENT DOCUMENTS

| EP | 1 770 609 A2 | 4/2007 |
| EP | 1 783 669 A2 | 5/2007 |
| JP | 09-030170 A | 2/1997 |

OTHER PUBLICATIONS

European Search Report dated Feb. 27, 2009, issued in corresponding European Patent Application No. 08162935.4.

* cited by examiner

*Primary Examiner* — Travis R Hunnings
(74) *Attorney, Agent, or Firm* — Westerman, Hattori, Daniels & Adrian, LLP

(57) ABSTRACT

A RFID tag includes: an antenna section having a first base and a loop antenna; a strap section having a second base and a first conductive pattern to which a circuit chip is electrically connected; and a protection section having a protection body having relatively high rigidity and a second conductive pattern in which the protection body has a groove formed therein large enough to house the circuit chip, and the second conductive pattern electrically connects the first conductive pattern to the loop antenna.

6 Claims, 9 Drawing Sheets

(a)

(b)

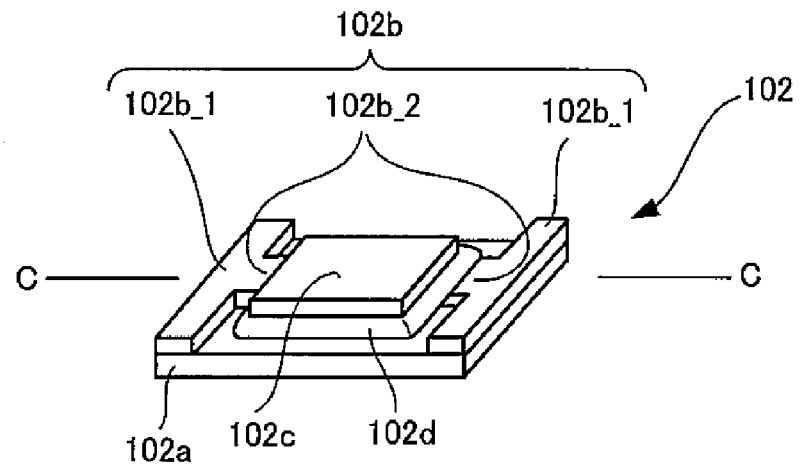
(a)
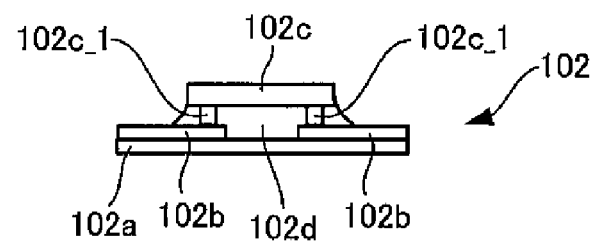
(b)
Fig. 7

RFID TAG AND METHOD FOR MANUFACTURING THE SAME

BACKGROUND OF THE INVENTION

1. Field of the Invention

The present invention relates to an RFID (Radio Frequency Identification) tag that contactlessly exchanges information with an external device and a method of manufacturing the RFID tag. As used herein, the term "RFID tag" may be also referred to as the term "wireless IC tag" by those skilled in the art.

2. Description of Related Art

A RFID tag is known, including a base made of plastic or paper and an antenna section arranged on the base and having an antenna for wireless communication, wherein a circuit chip is mounted on the antenna section, as a conventional RFID tag, which contactlessly exchanges information with an external device represented by a Reader/Writer.

FIG. 1 is a view illustrating an exemplary RFID tag.

Part (a) of FIG. 1 depicts a perspective view of an RFID tag 200, and Part (b) of FIG. 1 depicts a cross section of the RFID tag 200 taken along with line A-A of Part (a) of FIG. 1.

The RFID tag 200 includes a base 201a made of a sheet-shaped PET film, an antenna section 201 having a loop antenna 201b arranged on the base 201a, and a circuit chip 202 that is electrically connected to the loop antenna 201b through bumps 202a and fixedly mounted on the base 201 by an adhesive 203.

The circuit chip 202 included in the RFID tag may exchange a variety of information wirelessly with an external device (not shown) through the loop antenna 201b.

FIG. 2 is a view illustrating an exemplary method of manufacturing the RFID tag 200 shown in FIG. 1.

In step S21, a wafer 204, on which plural circuit chips 202 are formed on the surface, is prepared and then divided into the plural circuit chips 202, the method of which is called Wafer Dicing. Next in step S22, any one of the divided circuit chips 202 is adhered by an adhesion rotation nozzle 601, with a bottom surface of the circuit chip 202 where the bumps 202a are formed facing the adhesion rotation nozzle 601. Then, the adhesion rotation nozzle 601 rotates 180 degrees, with the circuit chip 202 adhered to the adhesion rotation nozzle 601, so that the opposite surface of the bottom surface, i.e., the top surface of the circuit chip 202, is directed upward in step S23. Next, while the top surface of the circuit chip 202 is adhered to a heating pressure head 602, the circuit chip 202 is separated from the adhesion rotation nozzle 601 in step S24. Subsequently, in a step not shown, the heating pressure head 602 is moved over a place of mounting the circuit chip 202, around which the adhesive 203 is applied on the antenna section 201, with the circuit chip 202 adhered to the heating pressure head 602, so that the circuit chip 202 may be positioned over the mounting place of the base 201a included in the antenna section 201. After then, the heating pressure head 602 moves down, so that the circuit chip 202 is positioned on the mounting place of the base 201a in step S25. In step S25, the positioning is precisely performed to ensure the loop antenna 201b contacts the tiny bumps 202a of the circuit chip 202. Then, the heating pressure head 602 heats the adhesive 203 at a temperature required to cure the adhesive 203, pressurizing the circuit chip 202 not to be floated over the adhesive 203 that has not been cured in step S26. The adhesive 203 hardens as the heating and pressurizing continue to be performed during a predetermined period of time, so that the circuit chip 202 becomes adhered to the base 201a, thus competing the RFID tag 200 in step S27.

The RFID tag thus prepared is generally attached to a product for use. For example, the RFID tag may be attached to a product, such as clothes, which may be easily deformed. In this case, there could occur a problem as described below, such as detachment of the circuit chip or disconnection between the antenna and the circuit chip.

FIG. 3 is a view illustrating an example of detachment of the circuit chip or disconnection of the antenna and the circuit chip in the RFID tag 200 shown in FIG. 1.

In a case where the RFID 200 is attached to a product which may be easily deformed, the antenna section 201 may be also easily bent by deforming of the product, since the base 201a included in the antenna section 201 is made of a material that may be easily bent. Although the base 201a is easily bent, the circuit chip 202 is difficult to bend, so that a bending stress may concentrate on a peripheral area of the circuit chip 202. Therefore, the bumps 202a may be separated from the loop antenna 201b, and this leads to detachment of the circuit chip 202 or disconnection between the circuit chip 202 and the loop antenna 201b.

Conventionally, a technique is known to public, for example, such as the one disclosed in Japanese Patent Application Publication No. H9-30170, where a circuit chip and its peripheral area are covered with a resin to prevent detachment of the circuit chip in a case where the circuit chip is mounted on a substrate made of a material that is easily bent.

FIG. 4 is a view illustrating an example where the circuit chip 202 and its peripheral area included in, for example, the RFID tag 200 shown in FIG. 1, are covered with a resin in order to prevent the detachment of the circuit chip 202.

Referring to FIG. 4, the resin 205 covers the peripheral area of the circuit chip 202 and the top surface of the circuit chip 202 as well as the adhesive 203 extending off the circuit chip 202. By doing so, it is possible to prevent the deformation of the base 201a included in the antenna section 201 from affecting the peripheral area of the circuit chip 202 that is vulnerable to such deformation, thus preventing the detachment of the circuit chip 202 or disconnection between the circuit chip 202 and the loop antenna 201b.

In the technique where the circuit chip and its peripheral area are covered with a resin shown in FIG. 4, however, it needs to thicken the resin layer more than a predetermined thickness to sufficiently protect the circuit chip. In the above technique for protecting the circuit chip, for example, the thickness of the resin layer should generally range from about 0.5 mm to about 1.0 mm. However, such a thickness of the resin layer counteracts the demand for a thinner RFID tag.

SUMMARY OF THE INVENTION

The present invention has been made in view of the above circumstances and provides a thin RFID tag capable of sufficiently protecting its circuit chip against deformation, and a method of manufacturing the RFID tag.

An RFID tag according to the present invention includes:

an antenna section having a first base and an antenna arranged on the first base;

a strap section having a second base smaller than the first base, a first conductive pattern arranged on the second base and electrically connected to the antenna, and a circuit chip connected to the first conductive pattern, mounted on the second base, and electrically connected to the antenna to perform wireless communication through the antenna; and a protection section having a protection body larger in rigidity than the first base and larger in size than the second base, the protection body having a groove formed therein large enough to accommodate the circuit chip, the protection section further having a second conductive pattern arranged on the protection body outside the groove, wherein the protection section is mounted on the antenna section such that the protection covers the strap section, with the circuit chip accommodated in the groove, the second conductive pattern is connected to the first conductive pattern, and the second conductive pattern is connected to the antenna.

Here in the RFID tag according to the present invention, it is preferable that "the protection body of the protection section may be made of a resin," or "in the strap section, the first conductive pattern is contact-connected to the circuit chip, and in the protection section, the second conductive pattern is contact-connected to the antenna, so that a contact area between the second conductive pattern and the antenna is larger than another contact area between the first conductive pattern and the circuit chip."

In the RFID tag according to the present invention, the circuit chip included in the strap section is connected to the antenna of the antenna section through the second conductive pattern of the protection section larger in rigidity than the base of the antenna. Accordingly, even though the first base is made of a material that may be easily deformed, such deformation of the first base hardly affect the strap section because of relatively high rigidity of the protection section, thus preventing detachment of the circuit chip or disconnection of the circuit chip from the first conductive pattern. In the RFID tag according to the present invention, a stress caused by deformation of the first base is liable to concentrate on a connection part between the second conductive pattern of the protection section and the loop antenna of the antenna section. However, unlike a case in which the circuit chip is electrically connected to an external device through the tiny bump, and thus the contact area is limited, contact between the second conductive pattern and the antenna according to the present embodiment may be made at any contact area. By having the second conductive pattern electrically connected to the antenna in a contact area broader than the contact area between the circuit chip and the first conductive pattern as in the exemplary embodiment of the present invention, it is possible to make the connection part between the second conductive pattern of the protection section and the loop antenna of the antenna section have a sufficient resistance against concentrating stress caused by deformation of the first base. The protection section, serving to protect the circuit chip against deformation as described above, may be easily made thin, which in turn allows the overall RFID tag to be made thin, by forming the protection body with resin, for example, as in the exemplary embodiment of the present invention. Accordingly, a thin RFID tag may be obtained where the circuit chip may be sufficiently protected against deformation according to the present invention.

Further preferably, the RFID tag according to the present invention may include a conductive adhesive tape that connects the first conductive pattern with the second conductive pattern each other, or that connects the second conductive pattern with the antenna each other.

Connection between the second conductive pattern and the first conductive pattern or connection between the second conductive pattern and the antenna may be simply made upon manufacture according to the preferred embodiment of the present invention.

A method of manufacturing an RFID tag according to another aspect of the present invention, a method of manufacturing an RFID tag includes the steps of:

preparing an antenna section having a first base and an antenna arranged on the first base, a strap section having a second base, a first conductive pattern, and a circuit chip, and a protection section having a groove formed therein large enough to accommodate the circuit chip, a protection body and a second conductive pattern, the second base of the strap section being smaller than the first base, the first conductive pattern being arranged on the second base to be electrically connected to the antenna, the circuit chip being connected to the first conductive pattern, mounted on the second base to be electrically connected to the antenna, thereby performing wireless communication through the antenna, the protection body being larger in rigidity than the first base and larger in size than the second base, the second conductive pattern arranged on the protection body outside the groove;

making the protection section cover the strap section so that the circuit chip is accommodated in the groove and the second conductive pattern is connected to the first conductive pattern; and mounting the protection section, which is made to cover the strap section in the covering step, on the antenna section so that the second conductive pattern is connected to the antenna.

In the method of manufacturing the RFID tag according to the present invention, the connection between the second conductive pattern and the antenna may be made at any contact area, and therefore, the positioning of the protection section may be less precisely and easily performed in the mounting step, which is advantageous at the time of manufacturing. That is, the present invention enables a method of manufacturing a thin RFID tag where the circuit chip may be sufficiently protected against deformation according to the present invention.

Although a basic manufacturing method of RFID tag has been disclosed herein to avoid repetition of description, the present invention is not limited thereto, and various types of RFID tag manufacturing methods may be included in the present invention, each of which corresponds to each of the RFID tags described above.

As described above, the thin RFID tag where the circuit chip is sufficiently protected against deformation and the method of manufacturing the thin RFID tag can be obtained according to the present invention.

BRIEF DESCRIPTION OF THE DRAWINGS

FIG. 7 is a detailed view of the strap section.

DETAILED DESCRIPTION OF THE INVENTION

Hereinafter, embodiments of the present invention will be described in more detail with reference to accompanying drawings.

Figure 5:
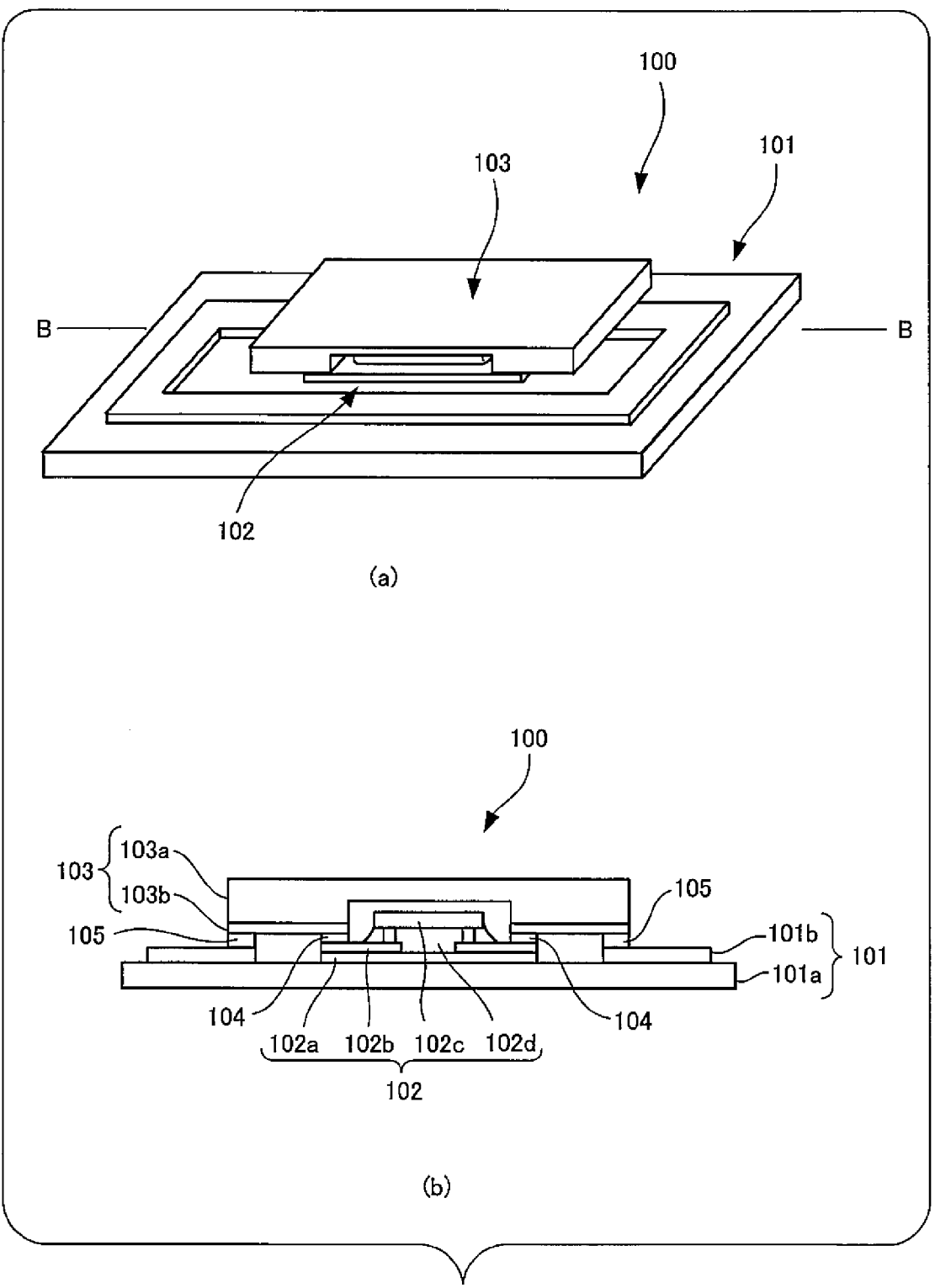
FIG. 5 is a view illustrating an RFID tag according to an embodiment of the present invention.

FIG. 5 is a view illustrating an RFID tag according to an embodiment of the present invention.

Part (a) of FIG. 5 depicts a perspective view of an exemplary RFID tag 100 according to an embodiment of the RFID tag of the present invention, and part (b) of FIG. 5 depicts a cross sectional view of the RFID tag 100 taken along the line B-B of Part (a) of FIG. 5.

Referring to FIG. 5, the RFID tag 100 includes an antenna section 101, a strap section 102, and a protection section 103 as described in detail below. The antenna section 101, the strap section 102, and the protection section 103 correspond to an example of the antenna section, an example of the strap section, and an example of the protection section, respectively, of the present invention.

Figure 6:
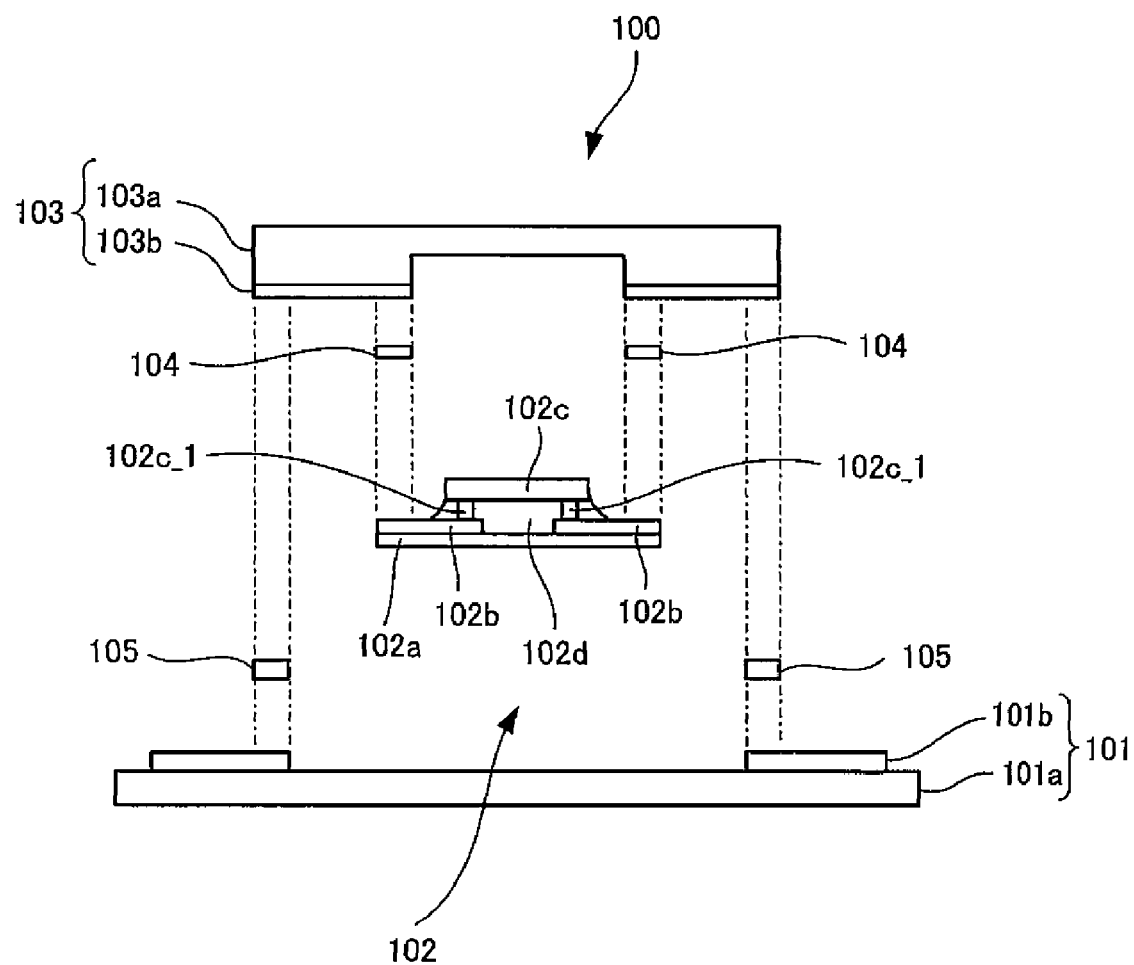
FIG. 6 is an exploded view of the RFID tag shown in FIG. 5, wherein the RFID tag is exploded into an antenna section, a strap section, and a protection section.
Figure 8:
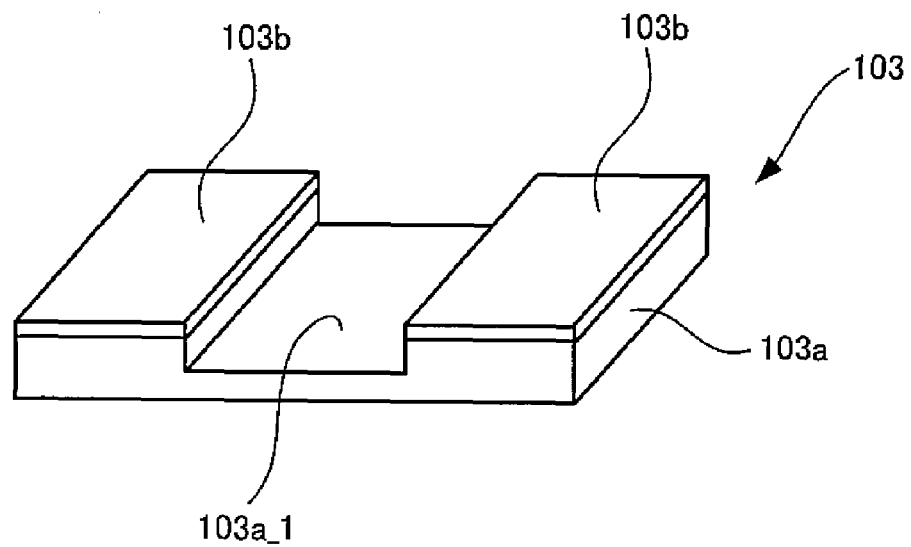
FIG. 8 is a detailed view of the protection section.
Figure 9:
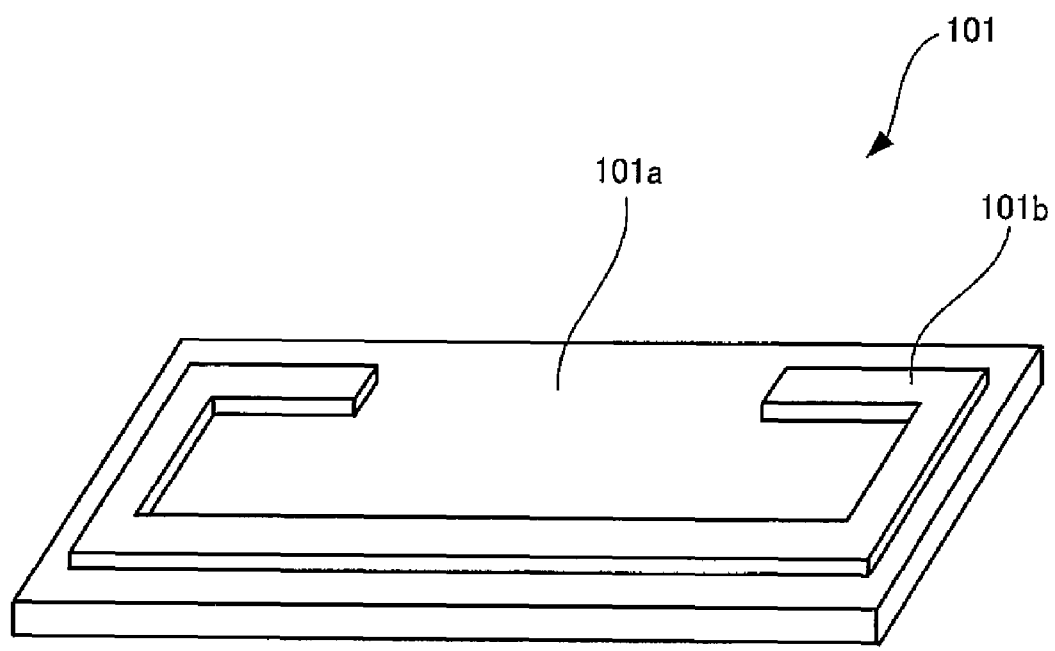
FIG. 9 is a detailed view of the antenna section.

FIG. 6 is an exploded view of the RFID tag 100 shown in FIG. 5, wherein the RFID tag 100 is exploded into the antenna section 101, the strap section 102, and the protection section 103. FIG. 7 is a detailed view of the strap section 102, FIG. 8 is a detailed view of the protection section 103, and FIG. 9 is a detailed view of the antenna section 101. Part (a) of FIG. 7 depicts a perspective view illustrating the strap section 102, and Part (b) of FIG. 7 depicts a cross sectional view of the strap section 102 taken along the line C-C of Part (a) of FIG. 7.

Hereinafter, each of the antenna section 101, the strap section 102, and the protection section 103 constituting the RFID tag 100 shown in FIG. 5 will be described also with reference to FIGS. 6 to 9.

The antenna section 101 includes a first base 101a made of a sheet-shaped PET film, and a loop antenna 101b arranged on the first base 101a. The first base 101a and the loop antenna 101b correspond to an example of the first base and an example of the exemplary loop antenna, respectively, of the present invention.

The strap section 102 includes a second base 102a made of a sheet-shaped PET film, a first conductive pattern 102b arranged on the second base 102a, and a circuit chip 102c electrically connected to the first conductive pattern 102b to perform wireless communication through the loop antenna 101b. The first conductive pattern 102b includes left and right electrode parts 102b_1 arranged on left and right ends, respectively, of the second base 102a and left and right pattern parts 102b_2 coupling the left and right electrode parts 102b_1 to left and right bumps 102c_1 of the circuit chip 102c, respectively, as shown specifically in FIG. 7. The circuit chip 102c is arranged so that the left and right bumps 102c_1 contact the left and right pattern parts 102b_2, and attached on the second base 102a by an adhesive 102d. The second base 102a, the first conductive pattern 102b, and the circuit chip 102c respectively correspond to an example of the second base, an example of the first conductive pattern, and an example of the circuit chip of the present invention.

The protection section 103 includes a protection body 103a larger in rigidity than the first base 101a, and left and right second conductive patterns 103b arranged on left and right ends, respectively, of the protection body 103a, each of which electrically connects the loop antenna 101b to the first conductive pattern 102b. The protection body 103a has a groove 103a_1 formed on a surface of the protection body 103a that faces the strap section 102. The groove 103a_1 has such width and depth that the circuit chip 102c of the strap section 102 may be accommodated in the groove 103a_1. The second conductive pattern 103b that is formed all over the surface like a sheet covers the peripheral area of the groove 103a_1 facing the strap section 102, as shown in FIG. 8. In the present embodiment, the protection body 103a is formed by molding fiber-enhanced resin in which glass fibers are dispersed in epoxy resin. The protection body 103a may sufficiently protect the circuit chip 102c with a thickness of about 0.2 mm. The protection body 103a and the second conductive pattern 103b correspond to an example of the protection body and an example of the second conductive pattern, respectively, of the present invention.

In the present embodiment, the strap section 102 is covered by the protection section 103, with the circuit chip 102c accommodated in the groove 103a_1 of the protection section 103, and the left and right second conductive pattern 103b of the protection section 103 are connected to the left and right electrode parts 102b_1, respectively, of the strap section 102 (see FIG. 7), as shown in FIGS. 5 and 6. The protection section 103, covering the strap section 102, is mounted on the antenna section 101, with the second conductive pattern 103b connected to the loop antenna 101b. The protection section 103 is fixedly attached to the strap section 102 by putting a conductive adhesive tape 104 between the electrode part 102b_1 and the second conductive pattern 103b, and the protection section 103 is fixedly attached to the antenna section 101 by putting a conductive adhesive tape 105 between the second conductive pattern 103b and the loop antenna 101b. The conductive adhesive tapes 104 and 105 correspond to an example of conductive adhesive tapes of the present invention.

As described above, the RFID tag 100 according to the present embodiment may prevent the detachment of the circuit chip 102c or disconnection of the circuit chip 102c from the first conductive pattern 102b included in the strap section 102 since the deformation of the first base 101a that may be easily bent can not affect the strap section 102 by the protection section 103 with high rigidity. In the RFID tag 100 of the embodiment, the stress caused by deformation of the first base 101a easily concentrates on a connection part between the second conductive pattern 103b of the protection section 103 and the loop antenna 101b of the antenna section 101. Thus, the RFID tag 100 of the embodiment ensures sufficiently broad contact area to overcome the concentration of the stress. Moreover, as the protection body 103a of the protection section 103, serving to protect the circuit chip 102c from deformation, is formed by molding fiber-enhanced resin, where glass fibers are dispersed in epoxy resin, this protection section 103 may sufficiently protect the circuit chip 102c with a thin width of about 0.2 mm. This makes the RFID tag 100 thin overall. As such, it is possible to implement a thin-type RFID tag capable of sufficiently protecting the circuit chip 102c from deformation according to the embodiment of the present invention.

Hereinafter, an embodiment of a method of manufacturing the RFID tag 100 will be described with reference to FIGS. 5 to 9.

Figure 10:
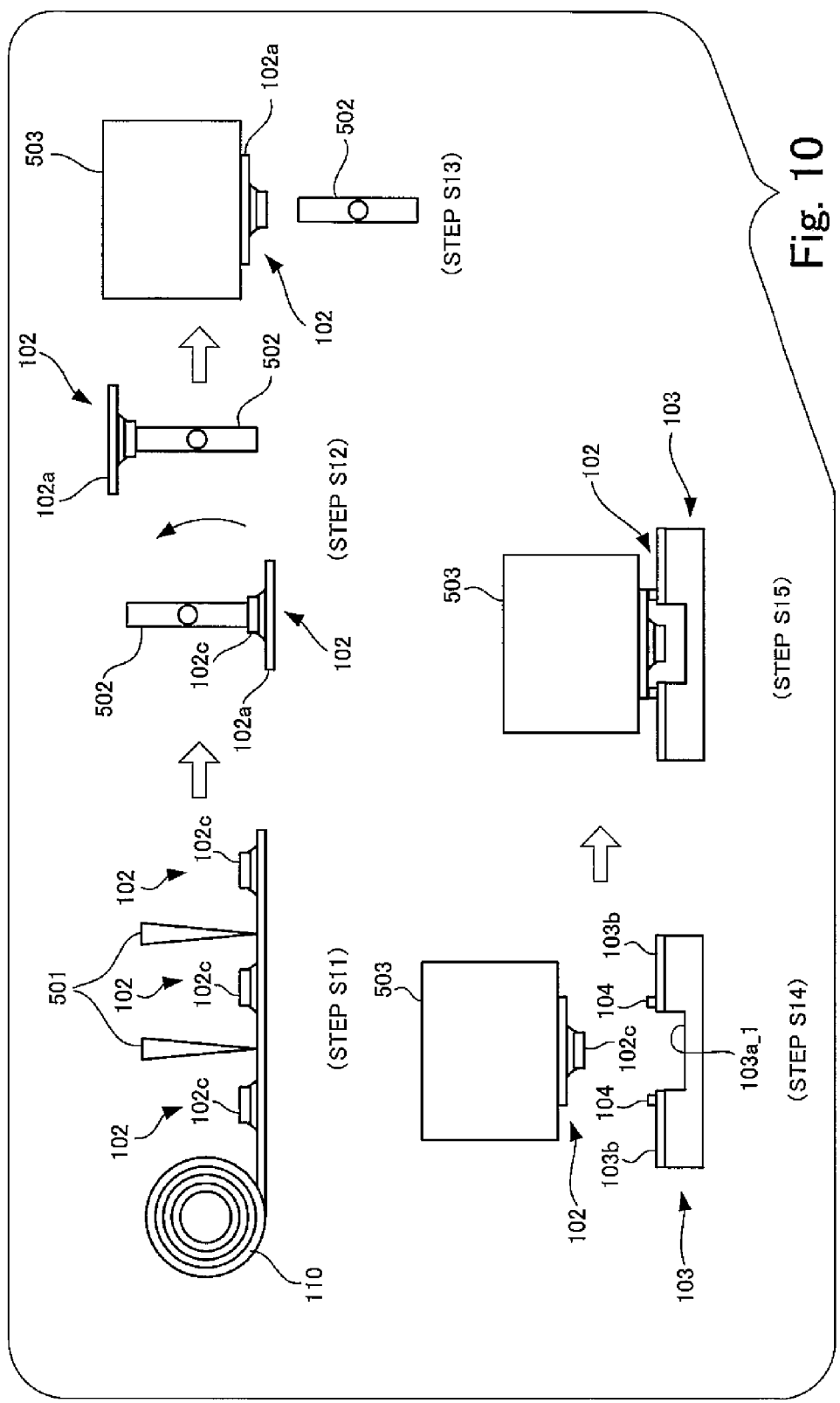
FIG. 10 is a view illustrating each step of the method of manufacturing the RFID tag performed until the protection section covers the strap section.
Figure 11:
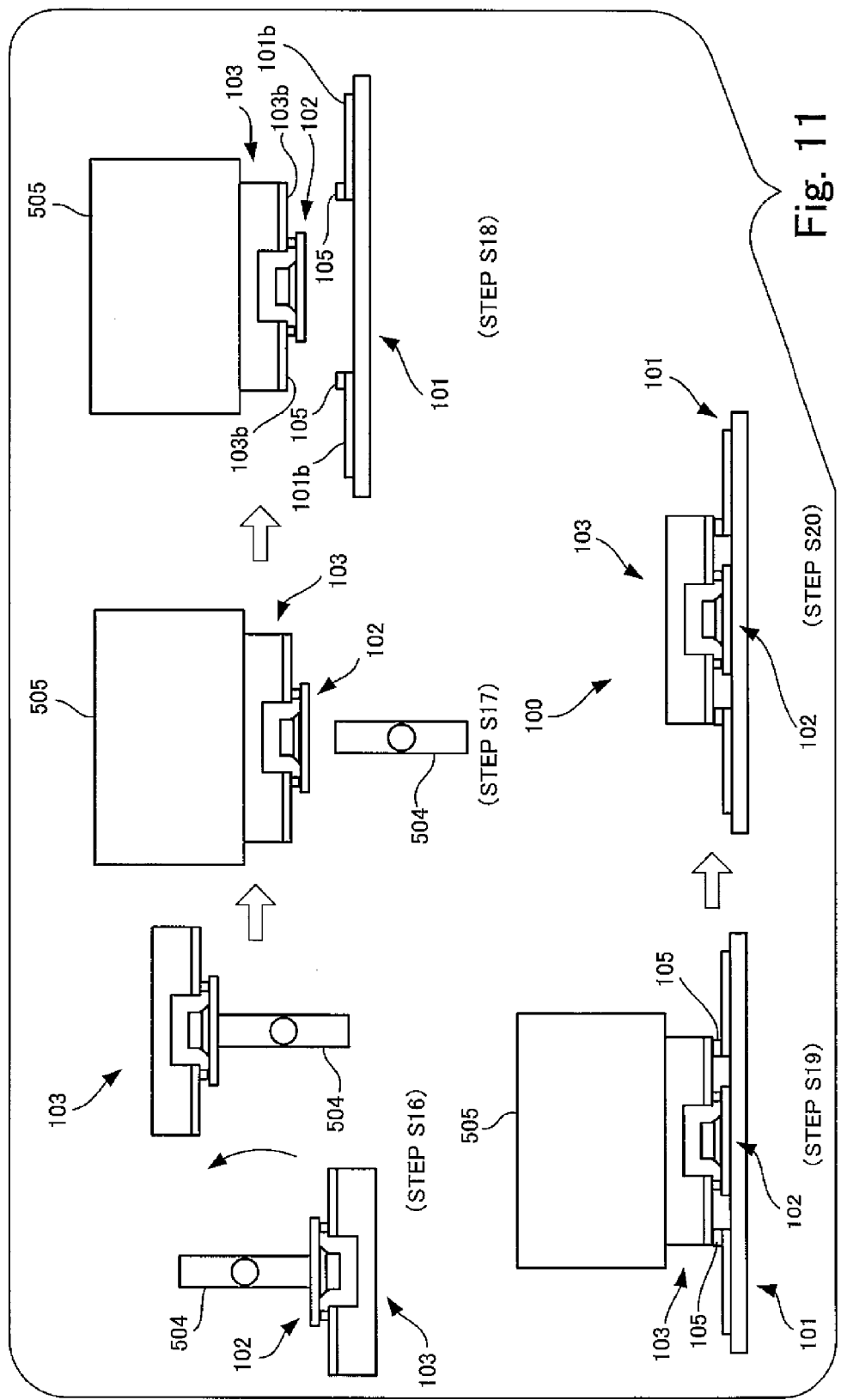
FIG. 11 is a view illustrating each step of the method of manufacturing the RFID tag performed until the protection section, which has been covering the strap section, is mounted on the antenna section, which completes the RFID tag.

FIG. 10 depicts each step of the manufacturing method of the RFID tag performed until the protection section 103 covers the strap section 102. FIG. 11 depicts each step of the method of manufacturing the RFID tag performed until the protection section 103, which has been covering the strap section 102, is mounted on the antenna section 101, which completes the RFID tag 100.

Referring to FIGS. 10 and 11, in the manufacturing method of RFID tag, firstly, the antenna section 101, the strap section 102, and the protection section 103 are prepared in step S11. Although the process in step S11 corresponds to the preparing step according to the present invention, the antenna section 101 and the protection section 103 are not shown in step S11 of FIG. 10, focusing on the preparation of the strap section 102.

Figure 1:
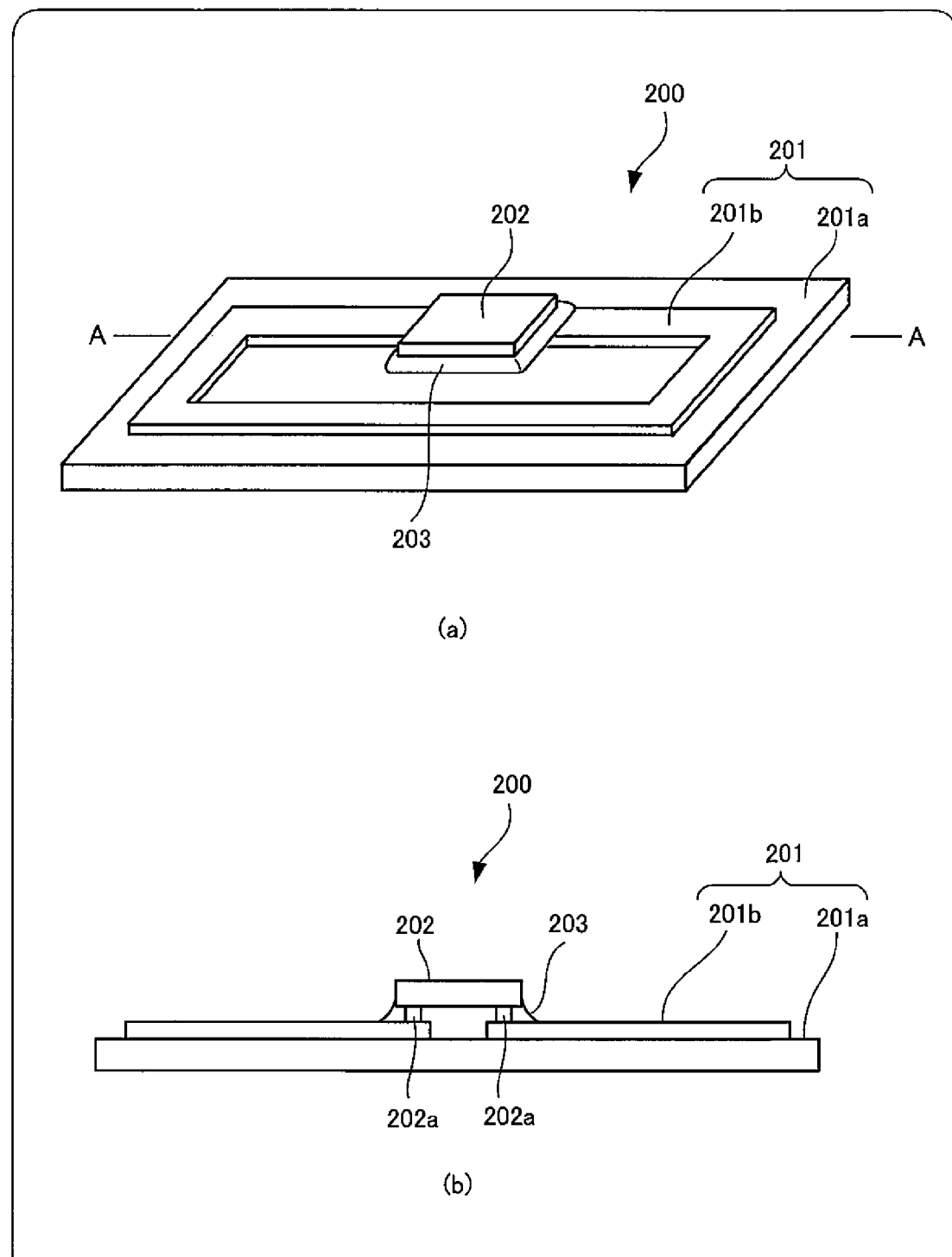
FIG. 1 is a view illustrating an exemplary RFID tag.
Figure 2:
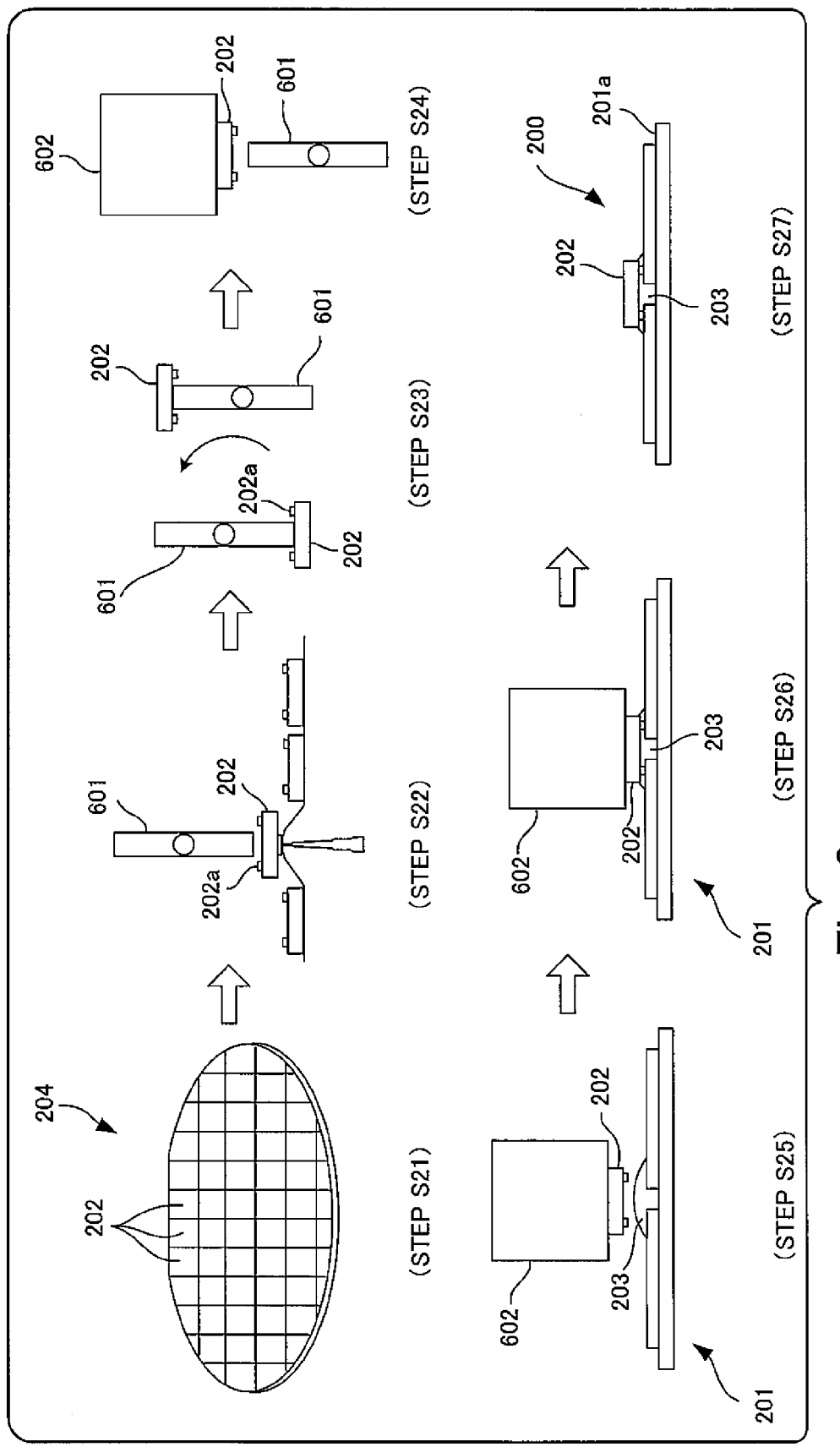
FIG. 2 is a view illustrating an exemplary method of manufacturing the RFID tag shown in FIG. 1.
Figure 3:
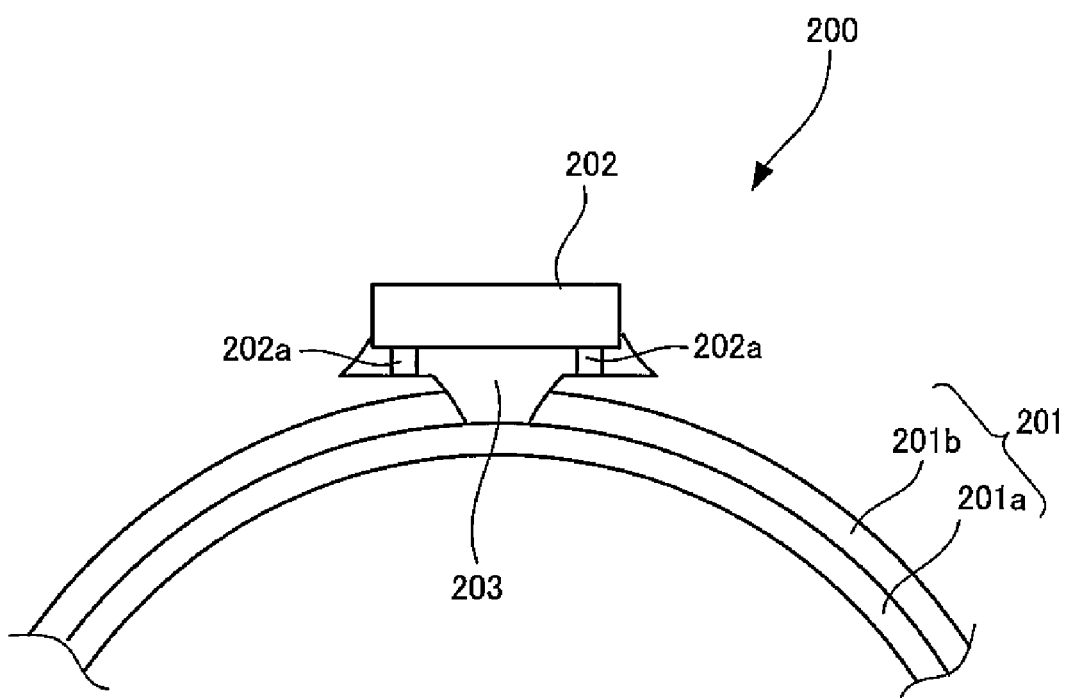
FIG. 3 is a view illustrating an example of the occurrence of detachment of the circuit chip or disconnection of the circuit chip from the antenna in the RFID tag 200 shown in FIG. 1.
Figure 4:
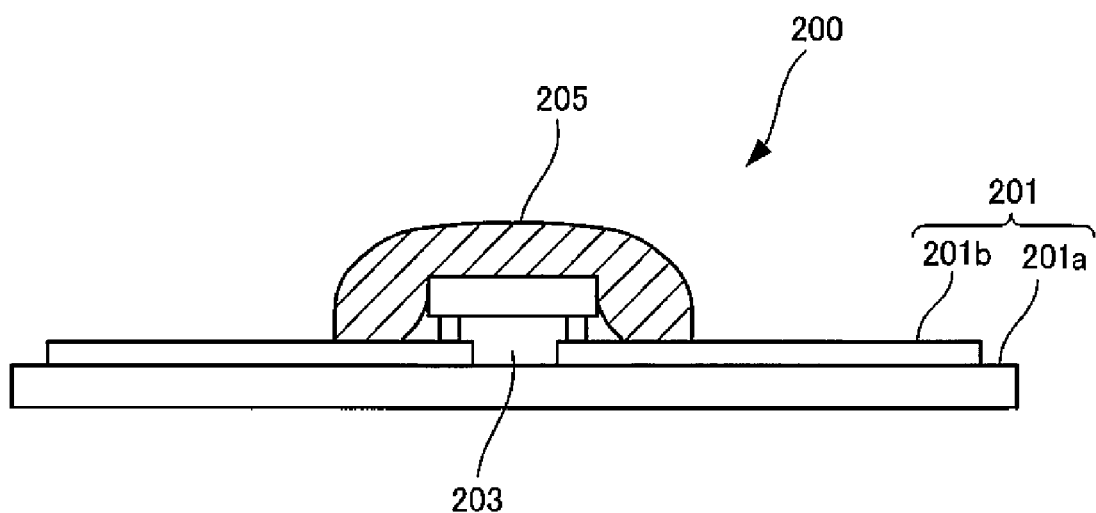
FIG. 4 is a view illustrating an example where the circuit chip and its peripheral area included, for example, in the RFID tag shown in FIG. 1, are covered with resin in order to prevent the detachment of the circuit chip.

In the preparation of the strap section 102, a reel body 110 is used, where the first conductive pattern 102b shown in FIG. 7 is provided in plurality on a long PET film so that the electrode part 102b_1 of one first electrode pattern is located adjacent to the electrode part 102b_1 of its neighboring first electrode pattern. In step S11, the long PET film is drawn out of the reel body 110, and the circuit chips 102c are mounted on the PET film, so that each of the circuit chips 102c is connected to each of the plural first conductive patterns 102b arranged on the PET film. The mounting of the circuit chip 102c is performed by attaching the circuit chip 102c on the PET film by the adhesive 102d. The process of mounting the circuit chip 102c is identical to that in the manufacturing method of the conventional RFID tag, described above with reference to FIG. 2, and therefore, the detailed description will be omitted. In step S11, the circuit chip 102c needs to be precisely positioned as in the conventional method of manufacturing the RFID tag in order to ensure that the first conductive pattern 102b may contact the tiny bumps 102c_1 of the circuit chip 102c (see FIG. 7). In addition, in the conventional method of manufacturing the RFID tag described above with reference to FIG. 2, when using the reel body as in the present embodiment, for example, a reel body on which plural loop antennas are arranged is required in order to mount the circuit chips. However, according to the present invention, since the first conductive pattern 102b is smaller than the loop antenna in the present embodiment, the plural first conductive patterns 102b may be arranged on the reel body 110 at higher densities compared to the arrangement of the loop antennas. As a consequence, the mounting of circuit chip 102c may be efficiently performed in the present embodiment compared to that in the conventional method of manufacturing the RFID tag. In step S11, after the circuit chip 102c has been mounted on the PET film, two adjacent electrode parts 102b_1 of two adjacent first conductive patterns 102b are separated from each other by a cutter 501, and this gives the strap section 102.

In step S12, the circuit chip 102c of the strap section 102 acquired in step S11 is adhered to a first adhesion rotation nozzle 502, and then the first adhesion rotation nozzle 502 rotates 180 degrees, with the strap section 102 adhered to the first adhesion rotation nozzle 502, so that the first base 102a of the strap section 102 is directed upward. Next, in step S13, the first base 102a of the strap section 102 is adhered to a first pressure head 503, and simultaneously, the strap section 102 is separated from the first adhesion rotation nozzle 502. Subsequently, in step S14, the first pressure head 503 is moved over the protection section 103, with the strap section 102 adhered to the first pressure head 503. At this time, the conductive adhesive tape 104 is arranged on the second conductive pattern 103b of the protection section 103 so that the electrode part 102b_1 of the strap section 102 may stick to the second conductive pattern 103b of the protection section 103. In step S14, the circuit chip 102c is located directly over the groove 103a_1 of the protection section 103, and simultaneously, the electrode part 102b_1 of the strap section 102 is located directly above the conductive adhesive tape 104 adhered to the second conductive pattern 103b of the protection section 103. In step S14, the positioning of the strap section 102 over the protection section 103 is precisely performed to ensure that the circuit chip 102c is accommodated in the groove 103a_1 of the protection section 103 and the electrode part 102b_1 contacts the second conductive pattern 103b of the protection section 103 when the strap section 102 is arranged over the protection section 103. And, in step S14, after the positioning, the first pressure head 503 moves downward so that the strap section 102 may be arranged over the protection section 103. After the arrangement, in step S15, the first pressure head 503 pressurizes the strap section 102 at a pressure as needed to secure the strap section 102 to the protection section 103 through the conductive adhesive tape 104. Through step S15, the strap section 102 is substantially covered with the protection section 103. The series of steps S12 through S15 correspond to an example of the covering step according to the present invention.

After the strap section 102 has been covered with the protection section 103, the process moves to step S16 of FIG. 11. In step S16, the protection section 103 that covers the strap section 102 is adhered to a second adhesion rotation nozzle 504, and then the second adhesion rotation nozzle 504 rotates 180 degrees, with the strap section 102 adhered to the second adhesion rotation nozzle 504, so that the protection section 103 is directed upward. In step S17, the protection section 103 that covers the strap section 102 is adhered to a second pressure head 505 and simultaneously separated from the second adhesion nozzle 504. In step S18, the second pressure head 505 is moved over the antenna section 101, with the protection section 103 covering the strap section 102 adhered to the second pressure head 505. The conductive adhesive tape 105 is attached on a part of the loop antenna 101b of the antenna section 101, on which the second conductive pattern 103b of the protection section 103 is to be arranged. In step S18, the protection section 103, which covers the strap section 102, is positioned over the antenna section 101, so that the second conductive pattern 103b of the protection section 103 is arranged directly over the conductive adhesive tape 105 attached to the loop antenna 101b. The positioning of the protection section 103 over the antenna section 101 may be less precisely performed in step S18 than the positioning of the circuit chip 102c in step S11 shown in FIG. 10 or the positioning of the strap section 102 in step S14 since the second conductive pattern 103b of the protection section 103 is broad enough that the second conductive pattern 103b may easily contact the conductive adhesive tape 105, as can be seen from FIG. 5 or 6, and therefore, in the present embodiment, the positioning of the protection section 103 may be simplified. In step S18, after the positioning has been completed, the second pressure head 505 moves downward, and the protection section 103 covering the strap section 102 is arranged over the antenna section 101. After the arrangement, in step S19, the second pressure head 505 pressurizes the protection section 103 at a pressure as needed to secure the protection section 103 to the antenna section 101 through the conductive adhesive tape 105. After step S19, the protection section 103 covering the strap section 102 is completely mounted on the antenna section 101, and the RFID tag 200 is complete in step S20. The series of steps S16 through S20 correspond to an example of the mounting step according to the present invention.

In accordance with the method of manufacturing the RFID tag as described above with reference to FIGS. 10 and 11, the thin RFID tag 100 may be manufactured where the circuit chip 102c has been sufficiently protected against the deformation described with reference to FIGS. 5 to 9. In the method of manufacturing the RFID tag, as described above, the mounting of the circuit chip 102c may be performed efficiently as described in step S11 with reference to FIG. 10, and the positioning of the protection section 103 may be simply performed as described in step S18 with reference to FIG. 11. In short, this method is suitable for use in manufacturing the RFID tag 100.

Although the first base 101a and the second base 102a, which are made of a sheet-shaped PET film, respectively, exemplify the first base and the second base according to the present invention, the present invention is not limited thereto. For example, the first base and the second base according to the present invention may be made of paper.

Although the protection body 103a made by molding the fiber-reinforced resin, where glass fibers have been dispersed in an epoxy resin exemplifies the protection body according to the present invention, the present invention is not limited thereto. For example, the protection body according to the present invention may be made of a hard resin or fiber-reinforced resin where carbon fibers have been dispersed in an epoxy resin.

Although the loop antenna 101b exemplifies the antenna according to the present invention, the present invention is not limited thereto. For example, the antenna according to the present invention may be a dipole antenna.

In the above-embodiments of the RFID tag according to the present invention, the securing of the strap section 102 to the protection section 103 and the securing of the protection section 103 to the antenna section 101 are performed by using the conductive adhesive tape. However, the present invention is not limited thereto. For example, such securing may be performed by using a conductive adhesive.

What is claimed is:

1. An RFID tag comprising:
   an antenna section having a first base and an antenna arranged on the first base;
   a strap section having a second base smaller than the first base, a first conductive pattern arranged on the second base and electrically connected to the antenna, and a circuit chip connected to the first conductive pattern, mounted on the second base, and electrically connected to the antenna to perform wireless communication through the antenna; and
   a protection section having a protection body larger in rigidity than the first base and larger in size than the second base, the protection body having a groove formed therein large enough to accommodate the circuit chip, the protection section further having a second conductive pattern arranged on the protection body outside the groove,
   wherein the protection section is mounted on the antenna section such that the protection section covers the strap section, with the circuit chip accommodated in the groove, the second conductive pattern is connected to the first conductive pattern, and the second conductive pattern is connected to the antenna.

2. The RFID tag according to claim 1, wherein the protection body of the protection section is made of a resin.

3. The RFID tag according to claim 1,
   wherein in the strap section, the first conductive pattern is contact-connected to the circuit chip, and
   in the protection section, the second conductive pattern is contact-connected to the antenna, so that a contact area between the second conductive pattern and the antenna is larger than another contact area between the first conductive pattern and the circuit chip.

4. The RFID tag according to claim 1, further comprising a conductive adhesive tape that connects the first conductive pattern with the second conductive pattern each other.

5. The RFID tag according to claim 1, further comprising a conductive adhesive tape that connects the second conductive pattern with the antenna each other.

6. A method of manufacturing an RFID tag comprising the steps of:
   preparing an antenna section having a first base and an antenna arranged on the first base, a strap section having a second base, a first conductive pattern, and a circuit chip, and a protection section having a groove formed therein large enough to accommodate the circuit chip, a protection body and a second conductive pattern, the second base of the strap section being smaller than the first base, the first conductive pattern being arranged on the second base to be electrically connected to the antenna, the circuit chip being connected to the first conductive pattern, mounted on the second base to be electrically connected to the antenna, thereby performing wireless communication through the antenna, the protection body being larger in rigidity than the first base and larger in size than the second base, the second conductive pattern arranged on the protection body outside the groove;
   making the protection section cover the strap section so that the circuit chip is accommodated in the groove and the second conductive pattern is connected to the first conductive pattern; and
   mounting the protection section, which is made to cover the strap section in the covering step, on the antenna section so that the second conductive pattern is connected to the antenna.

* * * * *